United States Patent
Gallagher

(10) Patent No.: US 9,998,270 B2
(45) Date of Patent: Jun. 12, 2018

(54) MIXED-MODE MOCA NETWORK

(71) Applicant: MaxLinear, Inc., Carlsbad, CA (US)

(72) Inventor: Timothy Gallagher, Encinitas, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days. days.

(21) Appl. No.: 15/211,897

(22) Filed: Jul. 15, 2016

(65) Prior Publication Data

US 2017/0019234 A1  Jan. 19, 2017

Related U.S. Application Data

(60) Provisional application No. 62/193,313, filed on Jul. 16, 2015.

(51) Int. Cl.
| | |
|---|---|
| *H04B 3/00* | (2006.01) |
| *H04L 25/00* | (2006.01) |
| *H04L 5/00* | (2006.01) |
| *H04B 3/52* | (2006.01) |

(52) U.S. Cl.
CPC ............. *H04L 5/0064* (2013.01); *H04B 3/52* (2013.01)

(58) Field of Classification Search
None
See application file for complete search history.

(56) References Cited

U.S. PATENT DOCUMENTS

| | | | | |
|---|---|---|---|---|
| 2008/0013612 | A1* | 1/2008 | Miller | H04L 12/2801 375/224 |
| 2008/0313691 | A1* | 12/2008 | Cholas | H04N 21/4147 725/131 |
| 2010/0238932 | A1* | 9/2010 | Kliger | H04L 12/4633 370/392 |
| 2011/0255452 | A1* | 10/2011 | Brooks | H04L 12/2801 370/297 |
| 2017/0078252 | A1* | 3/2017 | Klein | H04L 63/0428 |

* cited by examiner

*Primary Examiner* — Shuwang Liu
*Assistant Examiner* — Gina McKie
(74) *Attorney, Agent, or Firm* — McAndrews, Held & Malloy, Ltd.

(57) ABSTRACT

Methods and systems for a mixed-mode MoCA network, substantially as illustrated by and/or described in connection with at least one of the figures, as set forth more completely in the claims. For example and without limitation, various aspects of the present disclosure provide methods and systems for controlling communication bandwidth allocation in a mixed-mode mixed-band shared cable network.

20 Claims, 8 Drawing Sheets

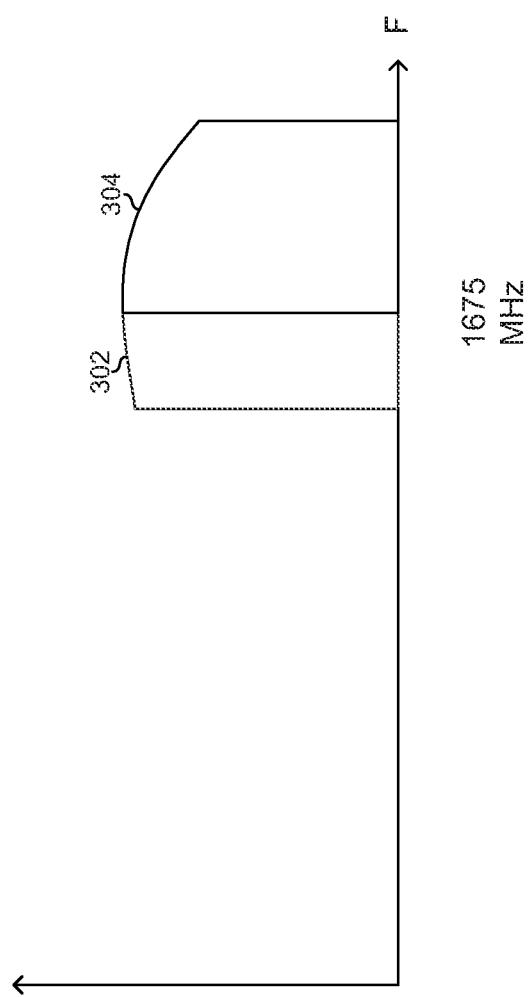

MIXED-MODE MOCA NETWORK

PRIORITY CLAIM

This application claims priority to and the benefit of the following application(s), each of which is hereby incorporated herein by reference:
U.S. provisional patent application 62/193,313 titled "Mixed-Mode MoCA Network" filed on Jul. 16, 2015.

BACKGROUND

Limitations and disadvantages of conventional approaches to multimedia over coaxial alliance (MoCA) networking will become apparent to one of skill in the art, through comparison of such approaches with some aspects of the present method and system set forth in the remainder of this disclosure with reference to the drawings.

BRIEF SUMMARY

Various aspects of the present disclosure provide methods and systems for a mixed-mode MoCA network, substantially as illustrated by and/or described in connection with at least one of the figures, as set forth more completely in the claims. For example and without limitation, various aspects of the present disclosure provide methods and systems for controlling communication bandwidth allocation in a mixed-mode mixed-band shared cable network.

BRIEF DESCRIPTION OF THE DRAWINGS

FIG. 3 illustrates the spectrum used on the MoCA network of FIG. 1.

DETAILED DESCRIPTION

Figure 1:
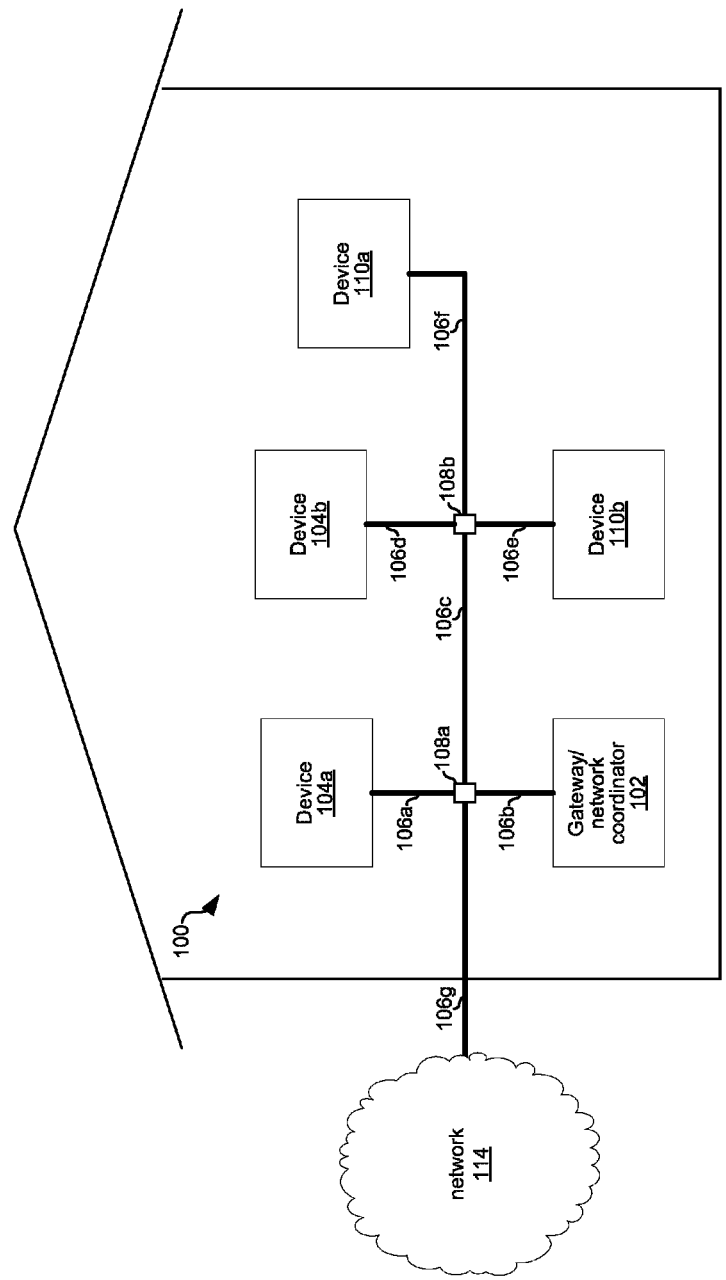
FIG. 1 depicts an example MoCA network adapted in accordance with aspects of this disclosure in order to permit concurrent communications among multiple pairs of nodes.

FIG. 1 depicts an exemplary MoCA network. Shown in FIG. 1 is a local area network (LAN) 100 connected to a network 114. The exemplary LAN 100 comprises a device 102 (e.g., a gateway device and/or network controller device, etc.), network devices 104a-104b and 110a-110b, coupled via links 106a-106g and splitters 108a-108b.

Each of the links 106a-106g may, for example, comprise wired cabling, optical cabling, and/or wireless links. In an exemplary embodiment, each of the links 106a-106g comprises coaxial cabling. The splitter 108a may, for example, be operable to electrically couple links 106a, 106b, 106c, and 106g such that the signal on each of such four links is substantially the same. The splitter 108b may, for example, be operable to electrically couple links 106c, 106d, 106e, and 106f such that the signal on each of such four links is substantially the same.

The device 102 comprises circuitry operable to communicate over the links 106a-106g. The circuitry of the device 102 may also be operable to communicate with network 114 (e.g., a CaTV network, a DSL network, a satellite network, etc.). The device 102 may be, for example, a set-top box or gateway operable to receive data from the network 114 via the links 106g and 106b, process the received data, and convey the processed data to the devices 104a-104b via the links 106a-106f. In an exemplary implementation, the device 102 may communicate the processed data over the links 106a-106f in accordance with multimedia over coaxial alliance (MoCA) standards, such as the "MoCA MAC/PHY Specification v2.0 MoCA-M/P-SPEC-V2.0-20100507," which is hereby incorporated herein by reference in its entirety. In such an example implementation, the device 102 may function as the network coordinator (NC) which handles allocation of timeslots and frequency bands for transmissions on the network. The device 102 may, for example, be a "new" or "next generation" MoCA node that is operable to concurrently communicate on a conventional ("old") MoCA band (e.g., band 302 in FIG. 3) as well as a "new" MoCA band (e.g., band 304 in FIG. 3).

Each of the devices 104a-104b may, for example, comprise circuitry operable to communicate over the links 106a-106f. The example devices 104a-104b may, for example, be "conventional" or "old" MoCA nodes operable to concurrently communicate on the old band 302 but not the new band 304.

Each of the devices 110a-110b may, for example, comprise circuitry operable to communicate over the links 106a-106f. The devices 110a-110b may, for example, be "next generation" or "new" MoCA nodes operable concurrently communicate on the old band 302 and the new band 304.

Thus, the example network 100 is mixed mode in that it comprises old and new nodes which support different bandwidths/frequency bands. The ability of nodes 102, 110a, and 110b to communicate on the old and new bands, and the ability of the nodes 104a and 104b to communicate on only the old bands may be taken into account when granting reservation requests on the network. In the example network 100, a reservation grant may be a grant to not only one or more timeslots but also to one or both of the bands 302 and 304.

Figure 2:
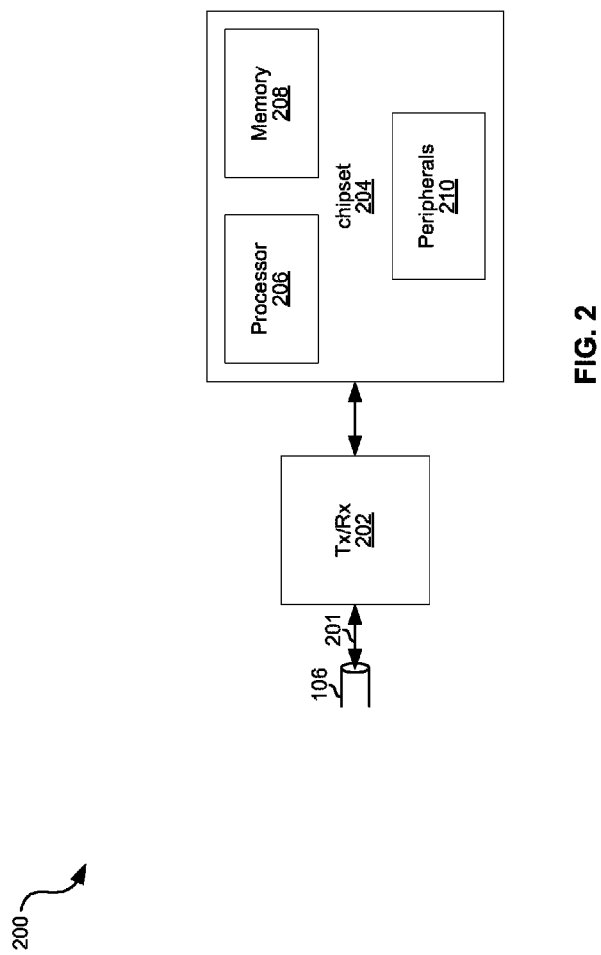
FIG. 2 is a general block diagram representing an example implementation of any of the MoCA devices of FIG. 1.

FIG. 2 is a general block diagram representing an example implementation of any of the MoCA devices of FIG. 1 (e.g., devices 102, 104a, 104b, 110a, 110b, etc.). The example device 200 comprises a transceiver 202 and a chipset 204.

Where the device 200 represents one of the devices 102, 110a, and 110b, the transceiver 202 is operable to transmit and receive on both bands 302 and 304 concurrently (or simultaneously) and on either band 302 and 304 separately. Where the device 200 represents one of the devices 104a and 104b, the transceiver 202 is operable to transmit and receive on only band 302.

The chipset 204 comprises a processor (e.g., x86 based, ARM based, an FPGA, ASIC, etc.) 206, memory 208 (e.g., DRAM, nonvolatile storage, a non-transitory machine-readable storage medium, etc.), and peripheral circuitry 210 (e.g., bus adaptor(s), LAN adaptor(s), etc.). When the device 200 represents the network controller (NC) 102, the processor 206, using memory 208, operates to decide whether to grant or deny reservation requests received via transceiver 202, determine which timeslot(s) and frequency(ies) to allocate for granted reservation requests, and to provide grant or denial messages to the transceiver 202 for transmission onto the cable 106. This may, for example, comprise the processor 206 performing the process described below with reference to FIG. 5.

FIGS. 4A-4G illustrate various combinations of concurrent communications on the MoCA network of FIG. 1.

Which transmissions may be scheduled concurrently may depend on the network topology and which devices are to transmit and which device(s) are to receive the two (or more) transmissions. For example, if cables 106d and 106f are short and cable 106c is long, and if device 104a is transmitting to device 102 on band 302 at the same time that device 102 is transmitting to device 110b on band 304, the signal from 104a may drown out the signal from device 102 at the device 110b (e.g., even though such signals are ideally in different bands). Accordingly, the network controller 102 may maintain data structures that indicate which bitloading, Tx power, and/or other parameters are to be used for a plurality of possible network statuses, where each different possible network status may correspond to a unique combination of two or more of the following parameters: devices in transmit mode, devices in receive mode, and devices that are idle. The data structures may indicate combinations of transmissions that are not reliable and should be prevented. For example, if a transmission from device 104a to device 102 should not be concurrent with a transmission from device 102 to device 110b, the data structure may indicate that a Tx power of 0 dBm is to be used for communications from device 104a to device 102 when concurrent with a transmission from device 102 to device 110b.

In some instances, the impedance that a device 102, 104, or 110 presents to the network 100 may depend on whether it is in transmit, receive, or idle mode. Accordingly, the different network statuses may take this into account. In an example implementation, however, each device may be configured (e.g., natively or through an adapter placed between the device and the cabling 106) to present a uniform impedance regardless of its mode. This may reduce the number of different statuses that need to be tracked by the data structures.

Figure 4A:
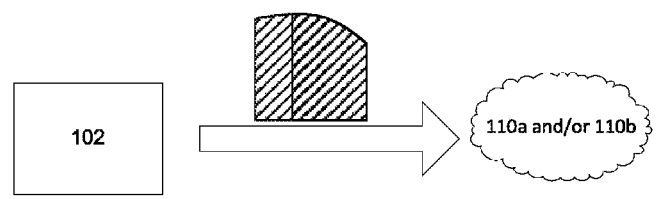
FIGS. 4A-4G illustrate various combinations of concurrent communications on the MoCA network of FIG. 1.

In the example scenario shown in FIG. 4A, device 102 is transmitting to one or both of devices 110a and 110b. Since all devices involved are next-generation devices, both bands 302 and 304 are used for the transmission. Note that the bands illustrated in FIGS. 4A-4G may, for example, coincide with the example bands illustrated in FIG. 3.

Figure 4B:
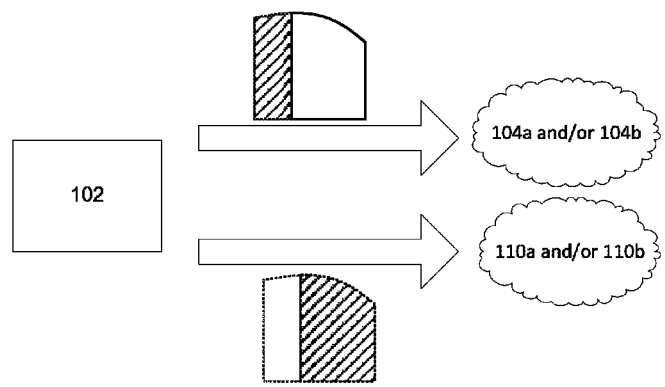

In the example scenario shown in FIG. 4B, device 102 is transmitting to one or both of devices 104a and 104b. Since devices 104a and 104b are old devices which do not support band 304, the transmission only uses band 302. As a result, band 304 is available. The network 100 may take advantage of this by scheduling another concurrent transmission from 102 to one or both of 110a and 110b on band 304. Which, if any, of these possible concurrent transmissions may be scheduled may depend on the network topology, and may be determined by reference to data structures holding bitloading tables and/or other transmission parameters.

Figure 4C:
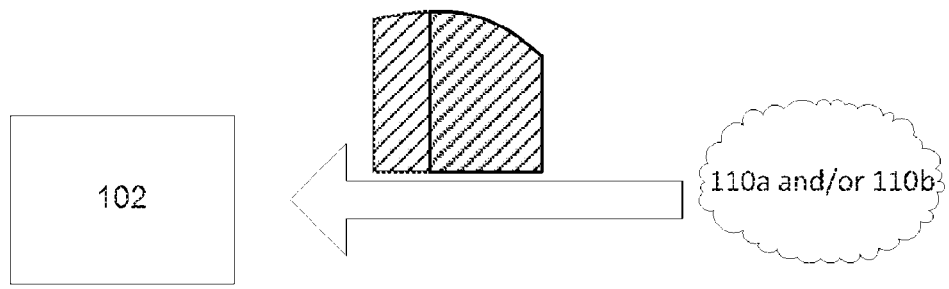

In the example scenario shown in FIG. 4C, one or both of devices 110a and 110b is/are transmitting to device 102. Since all devices involved are next-generation devices, both bands 302 and 304 are used for the transmission.

Figure 4D:
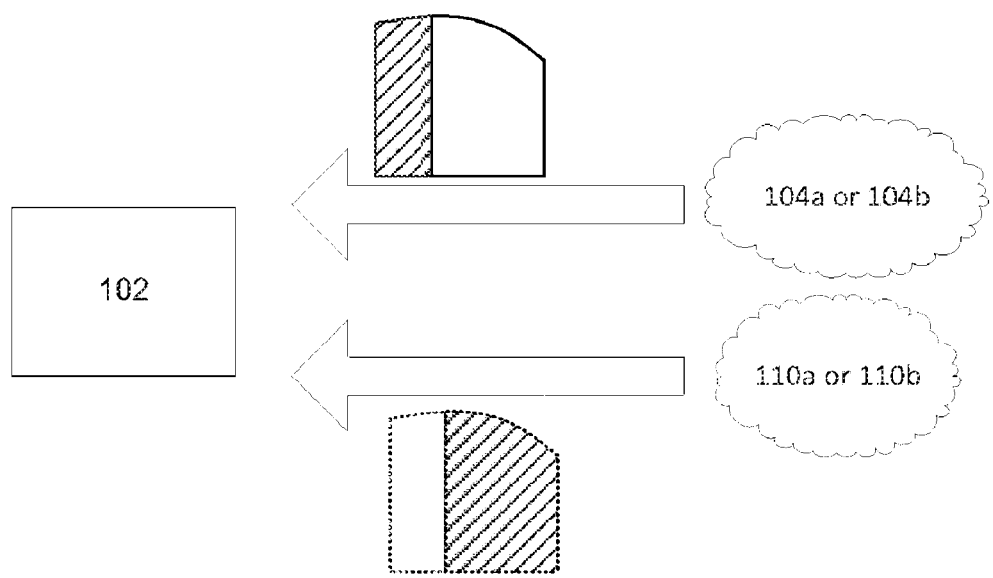

In the example scenario shown in FIG. 4D, one of devices 104a and 104b is transmitting to device 102. Since devices 104a and 104b are old devices which do not support band 304, the transmission only uses band 302. As a result band 304 is available. The network 100 may take advantage of this by scheduling another concurrent transmission from one of devices 110a and 110b to device 102 on band 304. Which, if any, of these possible concurrent transmissions may be scheduled may depend on the network topology, and may be determined by reference to data structures holding bitloading tables and/or other transmission parameters.

Figure 4E:
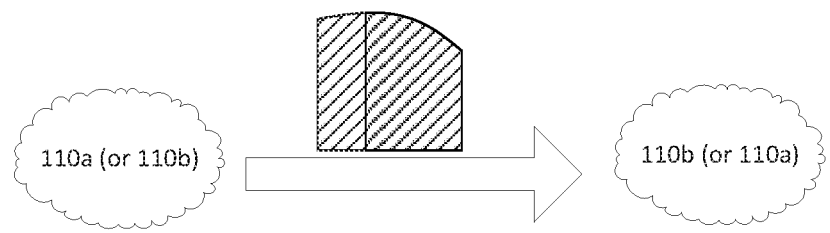

In the example scenario shown in FIG. 4E, one of devices 110a and 110b is transmitting to the other of devices 110a and 110b. Since 110a and 110b are next-generation devices, both bands 302 and 304 are used for the transmission.

Figure 4F:
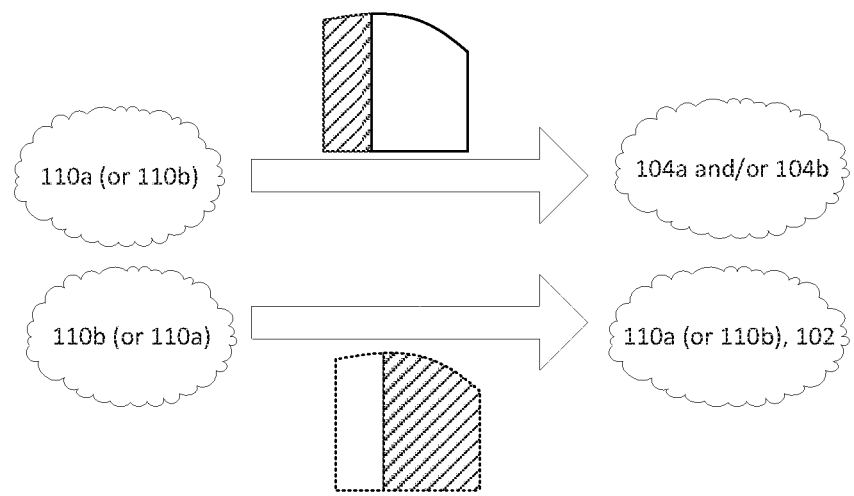

In the example scenario shown in FIG. 4F, one of devices 110a and 110b is transmitting to one or both of devices 104a and 104b. Since devices 104a and 104b are old devices which do not support band 304, the transmission only uses band 302. As a result, band 304 is available. The network 100 may take advantage of this by scheduling another concurrent transmission, on band 304, from the already transmitting one of devices 110a and 110b to the other one of devices 110a and 110b and/or to device 102. Which, if any, of these possible concurrent transmissions may be scheduled may depend on the network topology, and may be determined by reference to data structures holding bitloading tables and/or other transmission parameters.

Figure 4G:
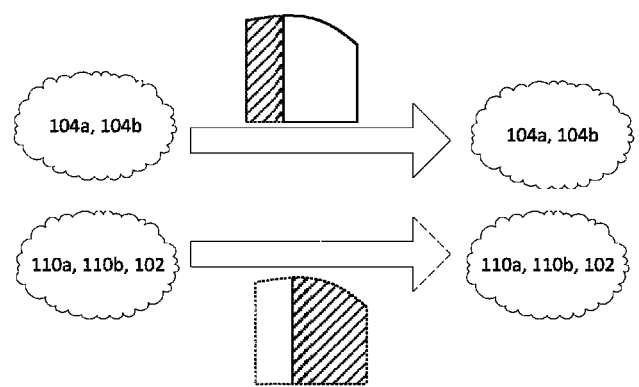

In the example scenario shown in FIG. 4G, one of devices 104a and 104b is transmitting to the other of devices 104a and 104b. Since devices 104a and 104b are old devices which do not support band 304, the transmission only uses band 302. As a result band 304 is available. The network 100 may take advantage of this by scheduling another concurrent transmission, on band 304, from one of devices 110a, 110b, and 102 to another one or more of devices 110a, 110b, and 102. Which, if any, of these possible concurrent transmissions may be scheduled may depend on the network topology, and may be determined by reference to data structures holding bitloading tables and/or other transmission parameters.

Figure 5:
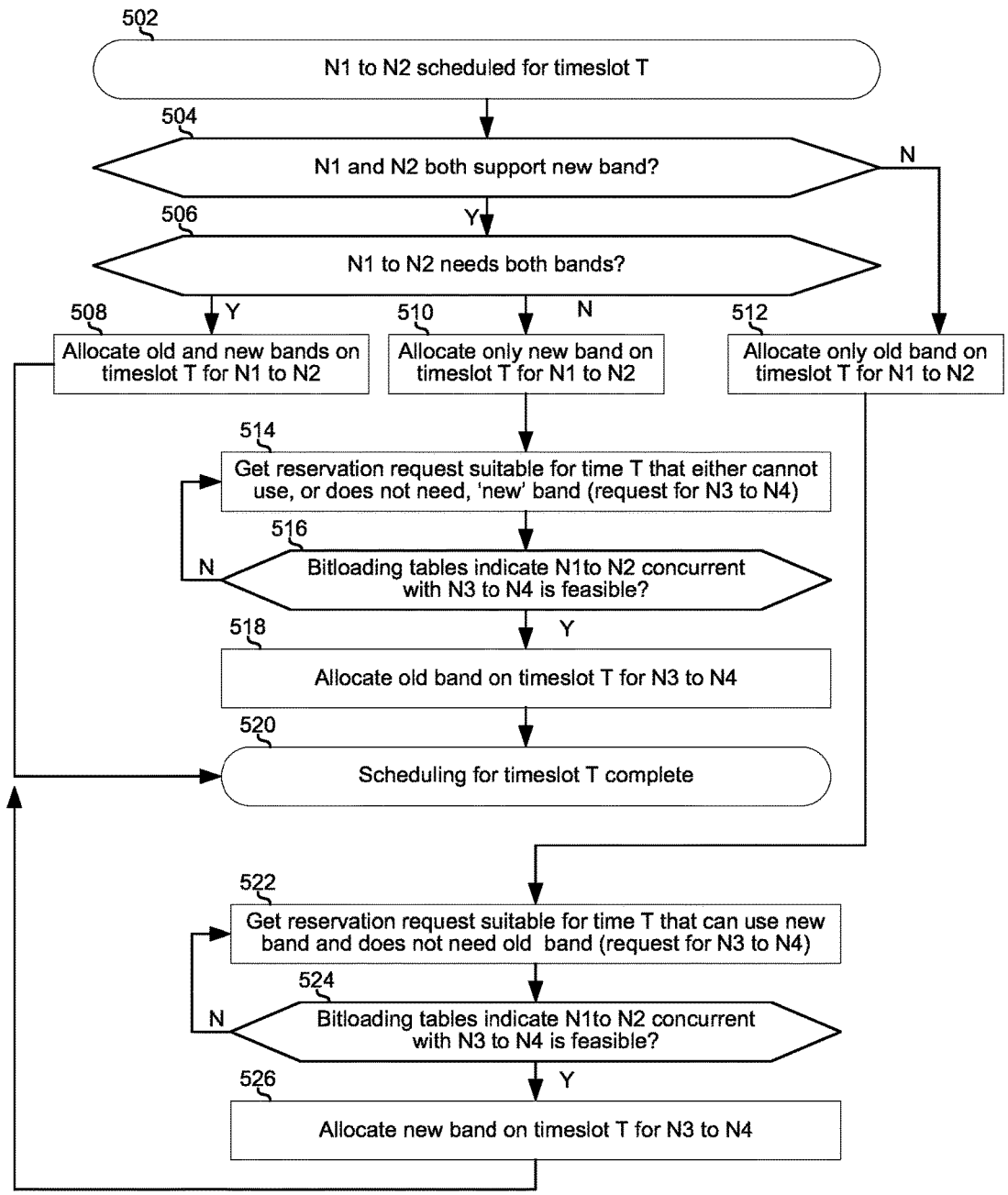
FIG. 5 is a flowchart illustrating an example process for granting reservation requests in a mixed-mode MoCA network.

FIG. 5 is a flowchart illustrating an example process (or method) for granting reservation requests in a mixed-mode MoCA network. The process begins in block 502 when a transmission from N1 to N2 (where 'N1' and 'N2' represent any arbitrary two of nodes 102, 104a, 104b, 110a, and 110b, for example) is scheduled for timeslot T.

In block 504, the network controller (NC) determines whether both N1 and N2 support band 304 (i.e., are they both "next-generation" nodes). This may be determined, for example, from information received when the nodes registered with the network controller. If both nodes are next generation nodes, then the process advances to block 506.

In block 506, the network controller determines whether the communication from N1 to N2 needs both bands 302 and 304. This may be determined from characteristics of the reservation request, for example (e.g., bandwidth requirements, data rate requirements, amount of data to communicate, etc.). If the communication does need both bands, the process advances to block 508. Otherwise, the process advances to block 510.

In block 508, the network controller allocates both bands 302 and 304 during timeslot T to the communication from N1 to N2.

In block 520, scheduling for timeslot T is complete.

Returning to block 506, if the communication from N1 to N2 does not need both bands, then the process advances to block 510.

In block 510, only new band 304 during timeslot T is allocated to the communication between N1 and N2.

In block 514, the network controller checks pending reservation requests to find one that is suitable (e.g., based on its urgency) for scheduling during timeslot T and that either cannot use, or does not need, new band 304. For purposes of discussion it will be assumed this reservation request is for a communication from N3 to N4 (where 'N3' and 'N4' represent any arbitrary two of nodes 102, 104a, 104b, 110a, and 110b, for example).

In block 516, bitloading tables are checked to determine whether a communication from N1 to N2 on band 304 concurrent with a communication between N3 and N4 on band 302 is acceptable (i.e., will it result in a sufficient likelihood of successful communication). If so, the process advances to block 518. If not, the process returns to block 514 to find another candidate pair N3 and N4 (or, in some instances, a timeout may occur and the network controller may settle for only N1 to N2 on band 304 during timeslot T).

In block 518, old band 302 during timeslot T is allocated to the communication between N3 and N4.

Returning to block 504, if N1 and N2 do not both support new band 304, then the process advances to block 512.

In block 512, only old band 302 during timeslot T is allocated to the communication between N1 and N2.

In block 522, the network controller checks pending reservation requests to find one that is suitable (e.g., based on its urgency) for scheduling during timeslot T and that can use the new band 304 (i.e., is between next generation nodes), and that does not need the old band 302. For purposes of discussion it will be assumed this reservation request is for a communication from N3 to N4 (where 'N3' and 'N4' represent any arbitrary two of nodes 102, 104a, 104b, 110a, and 110b, for example).

In block 524, bitloading tables are checked to determine whether a communication from N1 to N2 on old band 302 concurrent with a communication between N3 and N4 on new band 304 is acceptable (i.e., will it result in a sufficient likelihood of successful communication). If so, the process advances to block 526. If not, the process returns to block 522 to find another candidate pair N3 and N4 (or, in some instances, a timeout may occur and the network controller may settle for only N1 to N2 on band 302 during timeslot T).

In block 526, new band 304 during timeslot T is allocated to the communication between N3 and N4.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," "for example," "exemplary," and the like, set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method of allocating communication bandwidth in a mixed-mode MoCA network in which at least a first node is operable in a first mode corresponding to a first communication band and in which at least a second node is operable in a second mode corresponding to a second communication band different from the first communication band, the method comprising:
   receiving, by circuitry in a network controller of a network comprising a plurality of devices connected via a shared coaxial cable, a reservation request on the shared coaxial cable for a communication from a source node of the network to a destination node of the network;
   determining, by the circuitry, whether the source node and the destination node support operation in the second mode;
   allocating, by the circuitry, communication bandwidth for the communication based, at least in part, on whether both the source node and the destination node support operation in the second mode; and
   generating, by the circuitry, a reservation grant message that indicates the allocated communication bandwidth.

2. The method of claim 1, wherein said allocating comprises, if at least one of the first node and the second node does not support operation in the second mode, then allocating communication bandwidth for the communication in the first communication band and not in the second communication band.

3. The method of claim 2, wherein said allocating comprises, if the first node and the second node support operation in the second mode, then allocating communication bandwidth for the communication in the second communication band.

4. The method of claim 1, wherein supporting operation in the first mode is mandatory for all nodes in the mixed-mode network.

5. The method of claim 1, wherein said allocating comprises allocating the communication bandwidth for the communication based further, at least in part, on whether both of the first and second communication bands are needed for the communication.

6. The method of claim 1, wherein said allocating comprises:
   determining whether concurrent transmission of the communication with a second communication is feasible; and
   allocating the communication bandwidth for the communication based further, at least in part, on the determination of whether concurrent transmission of the communication with the second communication is feasible.

7. The method of claim 6, wherein said determining comprises determining whether concurrent transmission of the communication with the second communication is feasible based, at least in part, on bitloading.

8. The method of claim 6, wherein said determining comprises determining whether concurrent transmission of the communication with the second communication is feasible based, at least in part, on transmission power.

9. The method of claim 1, comprising after allocating the communication bandwidth for the communication and where the allocated communication bandwidth comprises only one of the first and second communication bands, determining whether a second communication may be performed concurrently with the communication on the other one of the first and second communication bands.

10. The method of claim 9, wherein said determining whether the second communication may be performed concurrently with the communication comprises analyzing one or more other pending reservation requests.

11. A system comprising:
    circuitry comprising a processor and memory for use in a controller of a mixed-mode MoCA network in which at least a first node is operable in a first mode corresponding to a first communication band and in which at least a second node is operable in a second mode corresponding to a second communication band different from the first communication band, wherein:
       the circuitry is operable to receive a reservation request on a shared coaxial cable for a communication from a source node of the network to a destination node of the network;
       the circuitry is operable to determine whether the source node and the destination node support operation in the second mode;
       the circuitry is operable to allocate communication bandwidth for the communication based, at least in part, on whether both the source node and the destination node support operation in the second mode; and
       the circuitry is operable to generate, by the circuitry, a reservation grant message that indicates the allocated communication bandwidth.

12. The system of claim 11, wherein said circuitry is operable to allocate the communication bandwidth by, at least in part, operating to if at least one of the first node and the second node does not support operation in the second mode, then allocate communication bandwidth for the communication in the first communication band and not in the second communication band.

13. The system of claim 12, wherein said circuitry is operable to allocate the communication bandwidth by, at least in part, operating to if the first node and the second node support operation in the second mode, then allocate communication bandwidth for the communication in the second communication band.

14. The system of claim 11, wherein supporting operation in the first mode is mandatory for all nodes in the mixed-mode network.

15. The system of claim 11, wherein said circuitry is operable to allocate the communication bandwidth by, at least in part, operating to allocate the communication bandwidth for the communication based further, at least in part, on whether both of the first and second communication bands are needed for the communication.

16. The system of claim 11, wherein said circuitry is operable to allocate the communication bandwidth by, at least in part, operating to:
    determine whether concurrent transmission of the communication with a second communication is feasible; and
    allocate the communication bandwidth for the communication based further, at least in part, on the determination of whether concurrent transmission of the communication with the second communication is feasible.

17. The system of claim 16, wherein said circuitry is operable to determine whether concurrent transmission of the communication with the second communication is feasible based, at least in part, on bitloading.

18. The system of claim 16, wherein said circuitry is operable to determine whether concurrent transmission of the communication with the second communication is feasible based, at least in part, on transmission power.

19. The system of claim 11, wherein said circuitry is operable to, after allocating the communication bandwidth for the communication and where the allocated communication bandwidth comprises only one of the first and second communication bands, determine whether a second communication may be performed concurrently with the communication on the other one of the first and second communication bands.

20. The system of claim 19, wherein said circuitry is operable to determine whether a second communication may be performed concurrently with the communication comprises by, at least in part, operating to analyze one or more other pending reservation requests.

* * * * *